Figure 1:
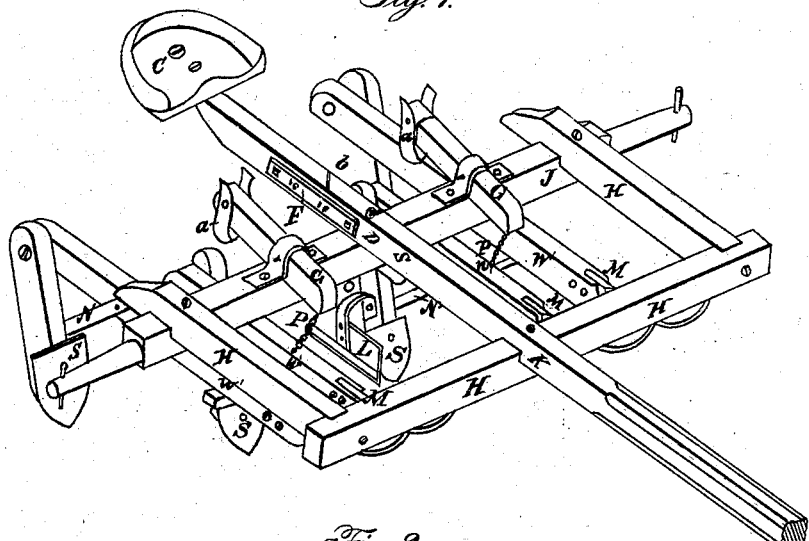

A. CANFIELD.
Wheel-Cultivator.

No. 68,165. Patented Aug. 27, 1867.

Witnesses:
Wm W Sanborn
R. D. McKnight

Inventor:
Andrew Canfield

AM. PHOTO-LITHO. CO. N.Y. (OSBORNE'S PROCESS).

United States Patent Office.

ANDREW CANFIELD, OF LYONS CITY, IOWA.

Letters Patent No. 68,165, dated August 27, 1867.

---

IMPROVEMENT IN CORN-CULTIVATORS.

---

*The Schedule referred to in these Letters Patent and making part of the same.*

---

TO ALL WHOM IT MAY CONCERN:

Be it known that I, A. CANFIELD, of Lyons City, Clinton county, State of Iowa, have invented a new and useful Improvement in Corn-Cultivators; and I do hereby declare that the following is a full, clear, and exact description of the construction and operation of the same, reference being had to the accompanying drawings and letters of reference marked thereon.

The nature of my invention consists in so constructing the seat and its support that it may be raised and lowered at will, so it may be readily adjusted for man or boy; also, to so construct and arrange a guard that it will regulate the supply of earth placed around the corn and prevent clods or lumps from falling on it; also, to so construct the beams of wood and iron, as to secure the requisite curve and give the proper angle to a shovel, that it may successfully perform its work.

To enable others to make and use my invention, I will carefully describe its construction and operation. Referring to the drawings—

Figure 1 is an isometrical view, showing the parts.

Figure 2:
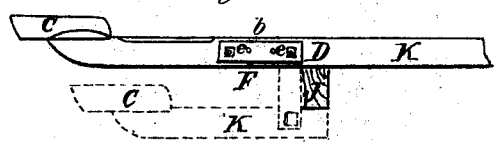

Figure 2, a side view of seat and method of lowering it.

Figure 3:
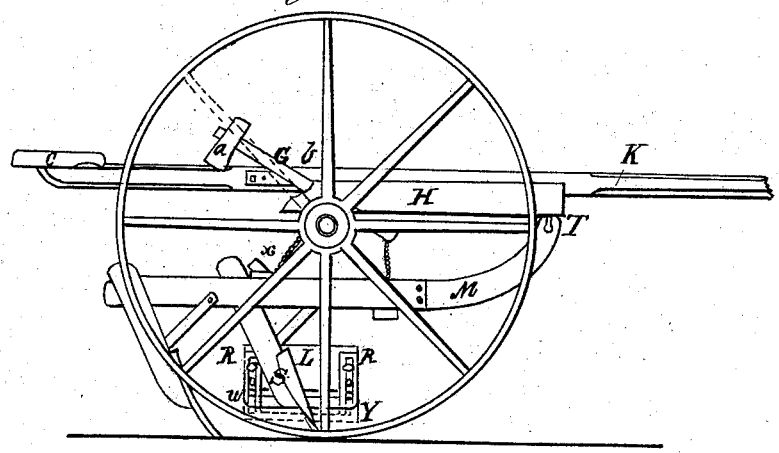

Figure 3, a side elevation, showing beam, guard, and shovel.

The letters refer to like parts in all the drawings.

$a$ represents a double stirrup on raising-lever G; $b$ represents the joint for raising or lowering seat; C represents seat; D represents strap on joint $b$ bolted to tongue; $e$ represents pins in joint $b$; F represents strap on joint; G represents raising-levers; H represents side pieces to frame and head; J represents axle-tree; K represents tongue; L represents guard to regulate the amount of earth; M represents joining of wood and iron in beams; N represents braces; O represents brace to hold regulating guard; P represents connecting-chains to raise shovels out of ground; R represents the stock for shovel; S represents shovels; T represents the eye-bolt in head-block; $w$ represents adjustable face to guard; $x$ represents stirrup on shovel-beams; $y$ represents guard when open, (see dotted lines.)

I construct the frame of any suitable material, as indicated in the drawings, properly bracing it. I construct the tongue of suitable wood and bolt it fast to the axle-tree and head-block, as shown in fig. 1. I make a joint in the tongue in the following manner: Cut the tongue off six or eight inches, more or less, from the axle-tree, and put on iron straps on each side, putting bolts through near the ends of straps; also put pins through near the joint, as shown in figs. 1 and 2. This is for the purpose of lowering the seat down below the axle-tree, so that the operator may be near the corn, affording him an opportunity to remove any earth that may happen to fall on it without getting off of his seat. I construct a guard of any suitable material, with an adjustable extension, to regulate the supply of earth thrown to the corn, and preventing any lumps or clods from falling upon it. I construct the beams of wood and iron, the iron connecting the eye-bolt in the front head-block, and the wood part of beam, bending the iron on a suitable curve to give the beam the proper angle to hold shovel in ground. In order to raise the shovels out of the ground, I construct levers hung over the axle-tree, attaching one end by means of any suitable device to the beams marked $w'$ in the drawings. On the back end of this lever I have a double stirrup for the convenience of the operator to operate the lever, the lower part of this stirrup to be used when the seat is lowered, thus allowing the operator to easily raise the shovels out of the ground when turning or going to or from the field. Now, to regulate the depth of the shovel I have an adjustable chain attached to a block that spans the beams, which chain can be hooked up on a hook set in axle-tree; thus this chain will regulate the depth of the shovels in the ground, or entirely raise them out of the ground when it is desirable to do so. The block of wood that spans the beams serves to hold them in their places; also, the stirrup, to govern and guide the beams, is attached to this block.

Now, the operation of my machine is as follows: If the seat is up in line with tongue, and I wish to lower it, I take out the pins $e$ $e$ and bring the support of the seat under the axle-tree, allowing the straps F to swing on the bolts, as shown in fig. 2 by the dotted lines, thus making the support firm. This principle of raising and lowering the seat can be applied to any cultivator. The operation of the adjustable guard is as follows: The guard is held in its place by means of a brace attached to the stock of the inner shovels, holding it in proper place between shovel and corn. Now, if the corn is small, and I wish to place but little earth around it, I raise the extension piece up and fasten it, nearly or quite closing the aperture through which the earth passes, thereby preventing the earth from falling on the corn. If the corn is larger, and I desire to hill up more, I loosen the slide and drop it down, thus enlarging the opening through which the earth passes, allowing more to fall around corn; still the stationary part of guard prevents any lumps or clods from falling on the corn. Thus I can increase or diminish the quantity of earth applied to the corn. The operation of the raising-lever and double stirrup is simple, for as the operator is seated in the seat he can use either the upper or lower one, as is most convenient, and if he wishes to raise the shovels out of the ground he places his feet in the stirrups, forces down the lever, and hooks the chain on the hook in the axle-tree, thus safely holding the shovels out clear of the ground and under perfect control of the operator.

What I claim as my invention, and desire to secure by Letters Patent, is—

1. The adjustable extension-guard, to regulate the amount of earth applied to young corn.
2. The raising-levers G G, in combination with the double stirrups $a\ a$, for the purpose above set forth.
3. The principle of raising and lowering a seat by means of a joint in the support of the seat, when used substantially as and for the purposes above set forth.

ANDREW CANFIELD.

Witnesses:
WM. W. SANBORN,
R. D. McKNIGHT.